O. ZWIETUSCH.
Carbonic Acid Gas Generators.

No. 150,995.          Patented May 19, 1874.

Witnesses:
John E. Kirsch
J. B. Smith

Inventor:
Otto Zwietusch

UNITED STATES PATENT OFFICE.

OTTO ZWIETUSCH, OF MILWAUKEE, WISCONSIN.

IMPROVEMENT IN CARBONIC-ACID-GAS GENERATORS.

Specification forming part of Letters Patent No. 150,995, dated May 19, 1874; application filed January 5, 1874.

*To all whom it may concern:*

Be it known that I, OTTO ZWIETUSCH, of Milwaukee, in the county of Milwaukee, in the State of Wisconsin, have invented certain Improvements in Carbonic-Acid-Gas Generators, of which the following is a specification:

My invention has for its object the generating of carbonic-acid-gas, and the machinery for accomplishing this object consists of a generator made of rubber, and is so arranged that it will stretch both ways, upward and downward.

The gas is generated by muriatic acid and marble chips. As soon as the marble comes in contact with the acid, gas is liberated, and the pressure of the same will stretch the rubber, and the marble will be lifted out of the acid, and the gas will cease to be generated; but as soon as the gas is decreased and the pressure is reduced, the marble will again come in contact with the acid, and gas will again be generated, and thus the generator acts automatically.

Figure 1:
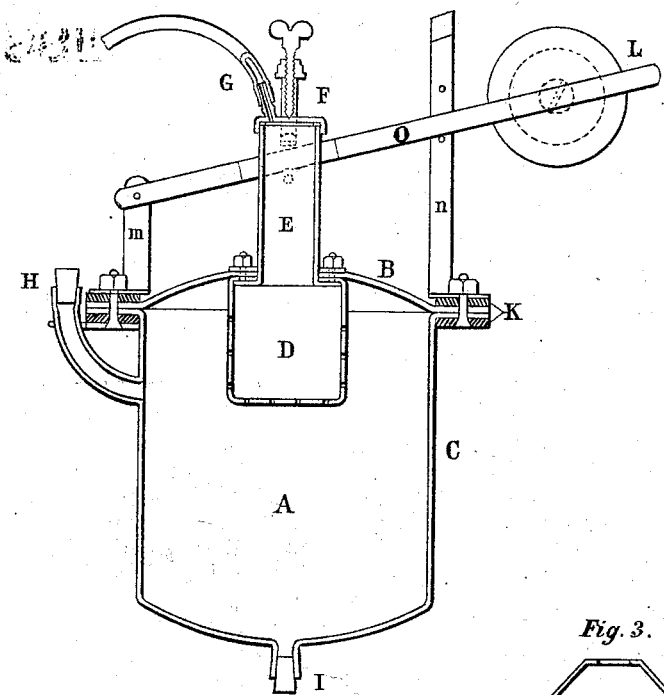
Figure 2:
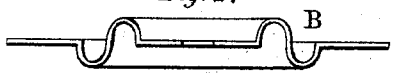
Figure 3:
Figure 4:
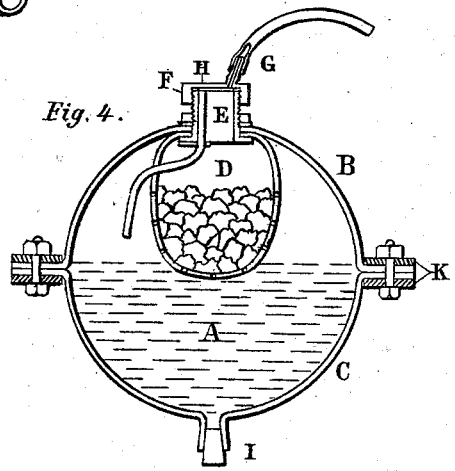

Figure 1 is a sectional view of my invention. Fig. 2 is a view of a section of rubber of which I sometimes form the cover of my generator. Fig. 3 is also a section of rubber which I sometimes use as a cover for the generator; and Fig. 4 is a sectional view of the generator as made without the lever and weight, as shown in Fig. 1.

A is the generating-chamber; B, the rubber cover of the generator; C, the generator made of rubber; D, marble-basket; E, supply-pipe connected to the basket; F, cap secured to the top of the supply-pipe; E G, outlet for the gas from the generator and supply-pipe for the gas to a washer; H, inlet-pipe to the generating-chamber; I, outlet-pipe at the bottom of the generator; K K, flanges of metal, which secure the cover B and generator C together; L, weight on the end of lever O; M, fulcrum of lever O; N, guide for lever O, and which steadies it; O, lever, which, with the weight L, gives pressure to the gas.

This generator is operated as follows: Fill in through inlet H acid sufficient for the purpose, and fill into basket D, through supply-pipe E, chips of marble, when the weight of the marble will sink the basket into the acid, and gas will be generated, and as the gas is generated, the space above the acid will be filled, and the pressure of the gas will stretch the generator C and cover B, so that the basket will be lifted out of the acid, the basket being secured to the cover B by a flange and bolts, so that it will be lifted as the cover is lifted, and gas will cease to be generated, and when a heavier pressure of gas is wanted than the elasticity of the generator and cover will produce, then a weight is put onto the lever O, and such pressure as may be desired will be obtained.

The Figs. 2 and 3 are merely to show different-formed covers that may be used.

The basket D is made of rubber, and attached and hung to cover B.

I claim as my invention—

1. Lever O and weight L, in combination with generator C, cover B, and pipe E, substantially as specified.

2. A carbonic-acid-gas generator constructed with cover B, generator C, and basket D, all of rubber, substantially as specified.

3. Basket D, attached to and hung to cover B, substantially as specified.

OTTO ZWIETUSCH.

Witnesses:
J. B. SMITH,
H. E. DICKINSON.